United States Patent Office 2,723,959
Patented Nov. 15, 1955

2,723,959

METHOD AND COMPOSITION FOR INHIBITING FOAM IN AQUEOUS LIQUIDS

Arthur L. Jacoby, deceased, late of Western Springs, Ill., by Ruth P. Jacoby, executrix, Western Springs, Ill., and George W. Luvisi, Chicago, Ill., assignors to National Aluminate Corporation, Chicago, Ill., a corporation of Delaware No Drawing. Application July 11, 1951, Serial No. 236,282

18 Claims. (Cl. 252—321)

This invention relates in general to defoaming and especially to antifoaming compositions adapted for use in aqueous systems in the manufacture of paper, paper board, glues, adhesives, sizings, and in other industrial processes and products where foaming is undesirable, including evaporation and the generation of steam.

Various materials have been proposed or used for the elimination or control of foaming in industry. Such agents as mineral, vegetable and animal oils, mineral waxes, metallic soaps, alcohols, and esters have been suggested for use in the manufacture and use of adhesives, paper sizings, etc., while various fats such as tallow, castor oil, sulfonated tallow, and sulfonated oils; monohydric alcohols, simple unsubstituted fatty acid amides, starch, and ketones have been suggested for use in evaporators and steam boilers. All of these materials are substantially water-insoluble per se, and, particularly in the paper and adhesives fields, their use may result in oil-spotting or accumulation of the antifoam in the product in an undesirable manner. Because of this, and in order to make their addition in measured doses easier, many different types of dispersing or emulsifying agents have been used with antifoam agents. However, because of the low order of efficiency of many of the prior art antifoam agents, and because of the pronounced foaming tendencies of many of the best dispersants, many such emulsions have been highly inefficient or have even aggravated the foaming tendencies they were intended to cure. Furthermore, the emulsions of the prior art have often been unstable if they possessed desirable fluidity, and if made sufficiently viscous to the stable, their subsequent thinning prior to use became a great inconvenience, required the use of special mixing equipment, and was time-consuming.

In addition, many of the materials of the prior art, besides being of a low order of efficiency as antifoams, decomposed chemically under conditions of use, or were driven off by vaporization, and thus lost their effectiveness in the process. In many instances, the products of decomposition were of such nature as to cause foaming.

It is an object of this invention to provide a novel antifoam composition useful in eliminating or reducing foaming in the manufacture of paper and paper products.

It is a further object of the invention to provide a novel antifoam composition useful in the manufacture and use of adhesives, sizings, coatings, and the like.

A further object of the invention is to provide a novel composition useful in eliminating or reducing foaming in evaporators and steam generators.

A further object is to provide a novel antifoam composition in the form of a stable, fluid emulsion.

A further object is to provide a novel antifoam composition of high chemical stability under a wide range of conditions of temperatures and pH and of low volatility even under conditions of high-pressure steam generation.

Another object of the invention is to provide a new and improved method for producing antifoam compositions of the type above described. Other objects will appear hereinafter.

In accordance with this invention, it has been found that certain polyacylated polyamines when emulsified with salts of amines having emulsifying properties are of a high order of effectiveness in combating foams of the type previously described. The polyacylated polyamines may also be defined as polyamides and for the purpose of this invention the acyl groups of these compounds preferably contain at least one hydroxy group, hence are referred to herein as hydroxy substituted polyamides containing at least one hydroxy substituent in at least one acyl group thereof. For the purpose of this invention, moreover, at least one and preferably two of the acyl groups in the polyamide should contain 12 or more carbon atoms, preferably 16 to 18 carbon atoms, and the total number of carbon atoms in the molecule of the polyamide should be at least 18 carbon atoms, preferably 30 to 60 carbon atoms.

These materials are extremely stable under the conditions encountered in industry, and can be used in low doses. When emulsified according to the method of this invention, the composition is a stable, fluid emulsion which can be further thinned with water, prior to use, with a minimum of mixing. Furthermore, the ingredients and the composition are non-volatile under the conditions of use and the potency of the active antifoam ingredient is sufficient to nullify any foaming tendencies possessed by the dispersants.

The polyamides referred to above are preferably derived by condensing polyalkylene polyamines with high molecular weight, hydroxylated fatty acids. The novel compositions of this invention preferably comprise (a) one or more active antifoam ingredients of the type just described, (b) a water-immiscible liquid which acts as a thinner or spreading agent for the active ingredient, (c) a salt of a high molecular weight amine, and (d) water. These components will be more particularly described below.

The condensation product between the high molecular weight, hydroxylated fatty acid and the polyalkylene polyamine is presumed to be the diacyl derivative of the amine and for convenience will be referred to in this way, but will be described also in terms of its mode of preparation, as we do not wish to be limited by any interpretation of the structure of the product. The expression "polyalkylene polyamine" as used herein refers to a chemical structure in which a plurality of alkylene groups (e. g., ethylene, propylene, and homologous groups) are interconnected by nitrogen atoms. The effectiveness of the diacylated polyalkylene polyamine varies with its melting point, and with the relation or "balance" between the hydrophilic nature of the central amine groups and the hydrophobic character of the two fatty acid chains, and it has been found that the diamide produced from two molecular proportions of a hydroxy acid such as ricinoleic acid or the acids of certain "blown" oils and one molecular proportion of a polyethylene polyamine containing at least three amine groups, e. g., diethylene triamine or triethylene tetramine, is especially useful and efficient. The presence of one or more secondary amino groups in the active antifoam ingredient apparently increases its water dispersibility and its antifoam efficiency. In general, the condensation product may be made by reacting the fatty acid body and polyamine in the proportions above mentioned at an elevated temperature, e. g., at 125° C. to 175° C. until the evolution of water is substantially stopped. Of course, the polyamide need not be synthesized from the free acid, but may be prepared from such acid derivatives as the esters or halides. Specific examples and preparative procedures will be given below.

The thinner is employed for the purpose of dissolving and "carrying" the polyamide, and may suitably be any water-immiscible liquid of low viscosity in which the polyamide is at least somewhat soluble. Examples of such a liquid would include certain alcohols, esters, ketones, nitriles, ethers, etc., but for reasons of economy a light petroleum distillate such as kerosene is preferred where the temperatures of use are not high. Naturally where the composition is to be employed at high temperatures, the thinner must be chosen so as to be substantially non-volatile.

The amine, a salt of which is employed as the emulsifying agent may be chosen from a large group which includes primary, secondary, and tertiary alkyl monoamines; primary, secondary, and tertiary aryl monoamines; aralkyl amines; mixed alkyl-aryl amines; and heterocyclic amines. Apparently the molecular size of the amine is of some importance: thus, among the primary alkyl monoamines, those of chain-length greater than octyl are of value; of the secondary alkyl monoamines, dioctylamine and dioctadecylamine are useful but the lower molecular weight amines are not; of the tertiary alkyl amines, triamylamine is useful and appears to be about the lower limit of molecular size.

While the preferred amines are the high molecular weight alkyl amines, or mixtures thereof which are now available, specifically, octadecylamine, hexadecylamine, dodecylamine, mixtures of octadecyl-, hexadecyl-, and octadecenylamines, and mixtures containing octadecadienylamine, other amines which have been found of value in the practice of this invention are sec. dioctadecylamine, sec. dioctylamine, tert. triamylamine, aromatic amines, e. g., aniline, ethylaniline, diethylaniline, alphanaphthylamine, diphenylamine, triphenylamine, aralkylamines, e. g., dibenzylamine, tribenzylamine, heterocyclic amines, e. g., pyridine, and quinoline.

Various water soluble acids can be utilized in forming the amine salt but we prefer to use low molecular weight aliphatic acids such as formic, acetic, and propionic. However, other acids including butyric, lactic, sulfamic, and hydrochloric can be employed.

The above described components of the composition are blended in the proper proportion with water to give a stable oil-in-water emulsion of the desired consistency. A desirable consistency is that which is thin enough to be readily poured from a drum or barrel and easily diluted, where desired, with additional water, and yet is thick enough not to be unstable.

The condensation products between the hydroxylated fatty acids and polyalkylene polyamines may be prepared in several ways, depending upon whether one starts with the acid, the ester, or the acid halide. The following examples are descriptive of a few such preparations, and are not intended to be limiting.

*Example I*

Into a jacketed iron kettle are introduced 77.5 pounds of commercial ricinoleic acid (0.26 mole) and 19 pounds of triethylene tetramine (0.13 mole) and the mixture stirred for three to five hours while heating at 150° C. to 160° C. When cool, the product is a soft, brown wax.

*Example II*

Two hundred-eighty grams of castor oil and 66 g. of triethylenetetramine were mixed and stirred for three hours at 150° C. to 160° C. When cool, the product was first a pale amber, viscous oil which slowly solidified to a pale yellow grease upon standing.

*Example III*

Twenty-four grams of 12-hydroxystearic acid and 5.85 g. of triethylenetetramine were heated at 150° C. to 160° C. for three hours with stirring. When cool, the product was a tough yellow wax.

*Example IV*

Twenty-four grams of 12-hydroxystearic acid and 4.13 g. of diethylenetriamine were heated at 150° C. to 160° C. for three hours with stirring. When cool, the product was a hard yellow wax.

*Example V*

N,N'-di(α hydroxy palmityl) diethylenetriamine was prepared by heating 1 mole of diethylenetriamine with 2 moles of alpha hydroxy palmitic acid at a temperature of 155° C. for four hours with stirring. The resultant product when cooled was a dark brown highly viscous liquid.

*Example VI*

N,N'-di (α hydroxy lauryl) diethylenetriamine was prepared by heating 1 mole of diethylenetriamine with 2 moles of alpha hydroxy lauric acid at a temperature of 155° C. for four hours with stirring. The resultant product when cooled was a black oil having a high viscosity.

*Example VII*

N,N-di(α hydroxy lauryl) di(1,2-propylene)triamine was prepared by heating 1 mole of di(1,2-propylene)triamine with 2 moles of alpha hydroxy lauric acid at a temperature of 155° C. for four hours with stirring. When cooled, the product was a very dark extremely viscous oil.

*Example VIII*

N,N'-di(ricinoleyl)di(1,2-propylene)triamine was prepared by heating 1 mole of di(1,2-propylene)triamine with 2 moles of ricinoleic acid at a temperature of 155° C. for four hours with stirring. The resultant product when cooled was a black viscous liquid similar in appearance to the product of Example VI.

The proportions of the ingredients of the composition of this invention may be varied over a considerable range, as more fully discussed below, and will be governed by several factors, among which may be mentioned the antifoam potency desired, the melting point of the active ingredient, the viscosity desired in the finished formula, and the temperature at which it is desired to use the composition.

In general, it may be stated that the softer the active ingredient, or the lower its softening temperature, the greater proportion can be incorporated in the composition; thus, while the lower limit of the per cent of active antifoam ingredient will be determined entirely by choice the upper limit may be about 50 per cent, by weight, of the total formula.

The amount of thinner or spreading agent can likewise be varied. Since its main function is to reduce the viscosity of the active ingredient and assist in its spreading in the process wherein the composition is employed, it will be apparent that with the active ingredients of higher softening points more thinner will be required to develop the maximum efficiency of the antifoam ingredients. Also, the higher the temperature at which the composition is to be employed, the less thinner is required, as the high temperatures render the active antifoam ingredients fluid of themselves.

In general it can be said that for formulas to be used under conditions of high temperatures and which are made from the lower melting antifoam ingredients, the thinner may even be omitted entirely, but when using active antifoam ingredients of relatively high softening points, and for compositions to be employed at ordinary temperatures, the thinner may be present to the extent of as high as 5 parts per part of active ingredient, except that the thinner would not ordinarily comprise more than 50 per cent of the composition.

The amine salt employed as an emulsifying agent is required to disperse the mixture of active ingredient and thinner and hold the entire composition in the form of a stable oil-in-water emulsion. The lower limit of the quantity required will be determined by the stability of the resulting emulsion, it being desirable to produce a product which will be reasonably stable during shipment and storage. The upper limit of the quantity of amine salt will be determined by other considerations—increasing the amount of amine salt will increase the stability of the emulsion, which has already been stated to be desirable, but it will also contribute to the viscosity of the composition and will, to a certain extent, detract from the potency of the composition as a defoamer. It can, therefore, be stated that in no case will it be desirable to use a large excess of amine salt over that quantity necessary to produce a stable, fluid emulsion, and in general the amine salt will be used to the extent of 0.1 to 0.5 part per part of combined active ingredient and thinner.

The method of compounding the materials of the invention consists simply of melting together the active antifoam ingredient or ingredients, if more than one is used, the thinner, and the amine with heating and mixing until homogeneous, and then adding the water with continued mixing and heating, incorporating with the first portions of water the acid which is necessary to form the amine salt. The temperature of the initial melt is conveniently carried to 60° C. to 90° C., the higher melting ingredients requiring the higher temperatures. During addition of the water and mixing, heating is continued so the temperature of the finished emulsion is within the range 60° C. to 90° C. at which temperature the emulsification will take place with simple, efficient agitation without the necessity of resorting to colloid mills or other special equipment.

The following examples are illustrative of the compositions of this invention:

Example IX

|   | Percent |
|---|---|
| Product of Example I | 10.0 |
| Mineral seal oil | 5.0 |
| Amine mixture | 2.0 |
| Acetic acid | 0.46 |
| Water | 82.54 |

Example X

|   | Percent |
|---|---|
| Product of Example I | 10.0 |
| Mineral seal oil | 40.0 |
| Amine mixture | 2.5 |
| Acetic acid | 0.6 |
| Water | 46.9 |

Example XI

|   | Percent |
|---|---|
| Product of Example I | 50.0 |
| Mineral seal oil | 15.0 |
| Amine mixture | 5.0 |
| Acetic acid | 1.1 |
| Water | 28.9 |

Example XII

|   | Percent |
|---|---|
| Product of Example I | 10.0 |
| Mineral seal oil | 5.0 |
| Amine mixture | 3.0 |
| Formic acid | 0.52 |
| Water | 81.48 |

Example XIII

|   | Percent |
|---|---|
| Product of Example I | 10.0 |
| Mineral seal oil | 5.0 |
| Amine mixture | 3.00 |
| Lactic acid | 1.02 |
| Water | 80.98 |

Example XIV

|   | Percent |
|---|---|
| Product of Example I | 10.0 |
| Mineral seal oil | 5.0 |
| Amine mixture | 3.0 |
| Sulphamic acid | 1.28 |
| Water | 80.72 |

Example XV

|   | Percent |
|---|---|
| Product of Example I | 10.0 |
| Mineral oil, U. S. P., extra heavy | 5.0 |
| Amine mixture | 5.0 |
| Acetic acid | 1.1 |
| Water | 78.9 |

Example XVI

|   | Percent |
|---|---|
| Product of Example I | 10.0 |
| Isophorone | 5.0 |
| Amine mixture | 5.0 |
| Acetic acid | 1.1 |
| Water | 78.9 |

Example XVII

|   | Percent |
|---|---|
| Product of Example I | 10.0 |
| 2-ethylhexanol | 5.0 |
| Amine mixture | 5.0 |
| Acetic acid | 1.1 |
| Water | 78.9 |

Example XVIII

|   | Percent |
|---|---|
| Product of Example I | 10.0 |
| Ethylene glycol 2-ethylbutyl ether | 10.0 |
| Amine mixture | 5.0 |
| Acetic acid | 1.1 |
| Water | 73.9 |

Example XIX

|   | Percent |
|---|---|
| Product of Example I | 10.0 |
| Octadecenonitrile | 5.0 |
| Amine mixture | 2.5 |
| Acetic acid | 0.6 |
| Water | 82.9 |

Example XX

|   | Percent |
|---|---|
| Product of Example III | 10.0 |
| Mineral seal oil | 5.0 |
| Amine mixture | 2.0 |
| Acetic acid | 0.46 |
| Water | 82.54 |

Example XXI

|   | Percent |
|---|---|
| Product of Example IV | 10.0 |
| Mineral seal oil | 5.0 |
| Amine mixture | 5.0 |
| Acetic acid | 1.2 |
| Water | 78.8 |

Example XXII

|   | Percent |
|---|---|
| Product of Example I | 10.0 |
| Mineral seal oil | 5.0 |
| Quinoline | 2.5 |
| Acetic acid | 1.17 |
| Water | 81.33 |

Example XXIII

|   | Percent |
|---|---|
| Product of Example I | 10.0 |
| Mineral seal oil | 5.0 |
| Pyridine | 5.0 |
| Acetic acid | 3.4 |
| Water | 76.6 |

Example XXIV

|   | Percent |
|---|---|
| Product of Example I | 10.0 |
| Mineral seal oil | 5.0 |
| Triamylamine | 5.0 |
| Acetic acid | 1.32 |
| Water | 78.68 |

Example XXV

| | |
|---|---|
| Product of Example I | 10.0 |
| Mineral seal oil | 5.0 |
| Aniline | 5.0 |
| Acetic acid | 3.22 |
| Water | 76.78 |

Example XXVI

| | Percent |
|---|---|
| Product of Example I | 10.0 |
| Mineral seal oil | 5.00 |
| Dodecylamine | 2.5 |
| Acetic acid | 0.81 |
| Water | 81.69 |

Example XXVII

| | |
|---|---|
| Product of Example I | 10.0 |
| Mineral seal oil | 5.0 |
| Sec. di 2-ethylhexylamine | 5.0 |
| Acetic acid | 1.25 |
| Water | 78.75 |

Example XXVIII

The polyamides prepared as described in Examples V, VI, VII and VIII were each formulated into emulsions having the following general formula:

| | Percent |
|---|---|
| Amide | 10 |
| Mineral seal oil | 5 |
| Amine mixture | 3 |
| Lactic acid | 1.02 |
| Water | 80.98 |

These formulations were then tested on a foaming aqueous solution containing sodium rosinate, cellulose, and Marasperse C (partially desulfonated, partially demethylated, degraded lignin sulfonate).

The test consisted of heating 200 cubic centimeters of solution in a Waring Blender for approximately 20 seconds. When the heating was stopped, it was observed that a considerable amount of foam had formed which was stable for approximately 30 minutes. The solution was again beaten for 20 seconds and 0.05 cubic centimeter of the emulsion was added. The foam that had formed quickly disintegrated and further beating produced only a little foam which disintegrated within 1 to 2 seconds after the beating was stopped. All four compounds behaved in this manner and were found to be good antifoams.

The amine mixture referred to in Examples IX to XI, inclusive, consists of hexadecylamine 25%, octadecylamine 70% and octadecenylamine 5%.

All of the compositions of the above examples are stable fluid emulsions of value as antifoams in the applications suggested hereinabove. Obviously the examples are illustrative only and other compositions of value can be made according to the general instructions given and using the materials and proportions outlined above.

In use, the composition is added to the process containing the foam it is desired to control. If it is desired to dilute it in order to make the addition of small quantities easier, this may be done readily by the use of water. Usually, the higher the dilution the less stable is the resulting emulsion and greater care will be required to prevent separation of the components during addition to the foaming system.

The dosage required to control foam will depend on many factors, among which are the nature and concentration of the materials causing the foaming, the percentage of active antifoam ingredient in the composition, the temperature of the system, the gaseous phase in the foam (whether air, steam, carbon dioxide, etc.), and the pressure of the system. Because of this, it is impossible to lay down any recommended practice that will fit all cases. In general, in determining the most economical dose to use, an over-dose is applied first to bring the foaming under control and a continuous dose is then fed at a gradually diminishing rate until the lowest safe dosage is found. In the manufacture of paper and paper board, a composition containing 10 per cent active ingredient was successfully used in a range of dosage from 0.5 lb. to 1.5 lb. of the composition (e. g., the composition of Example IX) per ton of paper produced. In the control of foaming in a locomotive boiler operating at 250 pounds per square inch steam pressure and high dissolved solids, the composition was successfully used in a quantity which gave about 0.2 to 0.3 grain per gallon of the composition in the feed water entering the boiler. Much lower concentrations have been observed to be valuable under certain circumstances.

The compositions prepared in accordance with this invention for use in inhibiting foaming are preferably oil-in-water emulsions, although the emulsions may be reversed, for example, by employing more acidic conditions in the preparation of the emulsion but with a decrease in the effectiveness of the product. The preferred pH of the antifoam emulsion is preferably within the range of about 6 to about 8 and very good results being obtained with emulsions having a pH 7.5. It will be understood that the pH of the material being treated may be substantially less than the pH of the emulsion. Thus, if the material being treated is paper pulp it will usually have a pH within the range of about 4.5 to 7.

It is preferable to add the defoaming composition to the material being treated at a point as close as possible to the source of the foam. In the paper making operation for instance, most of the foaming difficulties occur on the screen boxes and the cylinders (of a cylinder paper making machine). The defoaming compositions of the present invention may be added at any convenient point such as in the beater, to the screen boxes or at the fan pump.

The compositions of the present invention are stable and will remain in emulsion form over relatively long periods of time as required for storage and shipment. The emulsion of the composition is not broken by substances such as alum which are also present in some of the materials treated in accordance with the invention and would ordinarily precipitate soap emulsifiers. The compositions of the invention are also stable and can be used in defoaming treatments of various types of materials in aqueous systems over a relatively wide range of temperature conditions and pH conditions.

The present application is a continuation-in-part of co-pending application Serial No. 673,598, filed May 31, 1946, now abandoned.

The invention is hereby claimed as follows:

1. A foam inhibiting emulsion consisting essentially of water, a polyacylated polyalkylene polyamine from the group consisting of polyethylene polyamines and polypropylene polyamines, said polyacylated polyalkylene polyamine containing at least two acyl groups each having at least one hydroxy substituent and at least 12 carbon atoms, the total number of carbon atoms in the molecule being within the range of 30 to 60 carbon atoms, inclusive, a water-immiscible thinner in which said polyacylated polyamine is at least partially soluble, and a quantity of a salt of an amine effective to emulsify said polyacylated polyalkylene polyamine, said salt of said amine being a salt of a water soluble acid with an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic amines and heterocyclic amines, the quantity of said water immiscible thinner not exceeding 5 parts by weight per part of said polyacylated polyalkylene polyamine and not exceeding 50% by weight of the total weight of the emulsion, the quantity of said polyacylated polyalkylene polyamine not exceeding 50% by weight of the total weight of the emulsion, and the quantity of said amine salt being within the range of 0.1 to 0.5 part by weight per part of said polyacylated polyalkylene polyamine and thinner.

2. A stable emulsion consisting essentially of water, a diacylated polyalkylene polyamine from the group consisting of polyethylene polyamines and polypropylene polyamines, said polyacylated polyalkylene polyamine containing at least two acyl groups each having at least one hydroxy substituent and at least 12 carbon atoms, the total number of carbon atoms in the molecule being within the range of 30 to 60 carbon atoms, inclusive, a water-immiscible thinner in which said polyacylated polyamine is at least partially soluble, and an emulsifying quantity of an amine salt of a water soluble acid and an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic mono-amines and heterocyclic amines, the quantity of said water-immiscible thinner not exceeding 5 parts by weight per part of diacylated polyalkylene polyamine and not exceeding 50% by weight of the total weight of the emulsion, the quantity of the diacylated polyalkylene polyamine not exceeding 50% by weight of the total emulsion, and the quantity of the amine salt being within the range of 0.1 to 0.5 part by weight per part of diacylated polyalkylene polyamine and thinner.

3. A foam inhibiting emulsion consisting essentially of water, a diacylated polyalkylene polyamine from the group consisting of polyethylene polyamines and polypropylene polyamines in which each acyl group contains at least one hydroxy group and 12 to 18 carbon atoms, the total number of carbon atoms in the molecule being within the range of 30 to 60 carbon atoms, inclusive, a water-immiscible thinner in which said diacylated polyamine is soluble, and an emulsifying quantity of an amine salt of a water soluble aliphatic acid and a primary alkyl mono-amine in which the alkyl group contains 8 to 18 carbon atoms, inclusive, the quantity of said water-immiscible thinner not exceeding 5 parts by weight per part of diacylated polyalkylene polyamine and not exceeding 50% by weight of the total weight of the emulsion, the quantity of the diacylated polyalkylene polyamine not exceeding 50% by weight of the total emulsion and the quantity of the amine salt being within the range of 0.1 to 0.5 part by weight per part of diacylated polyalkylene polyamine and thinner.

4. A stable emulsion consisting essentially of water, a polyacylated polyethylene polyamine containing at least two acyl groups each having at least one hydroxy substituent and at least 12 carbon atoms, the total number of carbon atoms in the molecule being within the range of 30 to 60 carbon atoms, inclusive, a water-immiscible thinner in which said polyamine is at least partially soluble, and a quantity of salt of an amine effective to emulsify said polyacylated polyethylene polyamine, said salt of said amine being a salt of a water soluble acid with an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic mono-amines and heterocyclic amines, the quantity of said water immiscible thinner not exceeding 5 parts by weight per part of said polyacylated polyethylene polyamine and not exceeding 50% by weight of the total weight of the emulsion, the quantity of said polyacylated polyethylene polyamine not exceeding 50% by weight of the total weight of the emulsion, and the quantity of said amine salt being within the range of 0.1 to 0.5 part by weight per part of said polyacylated polyethylene polyamine and thinner.

5. An emulsion consisting essentially of water, a polyacylated polyethylene polyamine in which there are at least two acyl groups containing hydroxy substituents and at least 12 carbon atoms, the total number of carbon atoms in the molecule being within the range of 30 to 60 carbon atoms, inclusive, dispersed in a water-immiscible thinner and emulsified in water with a salt of a water soluble acid and an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic mono-amines and heterocyclic amines, the quantity of said amine salt being effective to emulsify said polyacylated polyamine, the quantity of said water immiscible thinner not exceeding 5 parts by weight per part of said polyacylated polyethylene polyamine and not exceeding 50% by weight of the total weight of the emulsion, the quantity of said polyacylated polyethylene polyamine not exceeding 50% by weight of the total weight of the emulsion, and the quantity of said amine salt being within the range of 0.1 to 0.5 part by weight per part of said polyacylated polyethylene polyamine and thinner.

6. An emulsion consisting essentially of water, a diacylated polyethylene polyamine in which each acyl group contains at least one hydroxy group and 12 to 18 carbon atoms, the total number of carbon atoms in the molecule being within the range of 30 to 60 carbon atoms, inclusive, a water-immiscible thinner in which said diacylated polyamine is at least partially soluble, and a quantity of a salt of a water soluble acid and an alkyl mono-amine effective to emulsify said diacylated polyethylene polyamine, the alkyl groups in said alkyl mono-amine containing 8 to 18 carbon atoms in the case of the primary and secondary amines, and 5 to 18 carbon atoms in the case of the tertiary amines, the quantity of said water immiscible thinner not exceeding 5 parts by weight per part of said diacylated polyethylene polyamine and not exceeding 50% by weight of the total weight of the emulsion, the quantity of said diacylated polyethylene polyamine not exceeding 50% by weight of the total weight of the emulsion, and the quantity of said amine salt being within the range of 0.1 to 0.5 part by weight per part of said diacylated polyethylene polyamine and thinner.

7. An emulsion consisting essentially of water, the polyacylated product of the reaction of castor oil with triethylene tetramine, a water-immiscible thinner in which said polyacylated product is at least partially soluble, and a salt of a water soluble acid and a primary alkyl mono-amine in which the alkyl group contains 8 to 18 carbon atoms, inclusive, the quantity of said primary alkyl mono-amine salt being effective to emulsify said polyacylated product, the quantity of said water immiscible thinner not exceeding 5 parts by weight per part of said polyacylated product and not exceeding 50% by weight of the total weight of the emulsion, the quantity of said polyacylated product not exceeding 50% by weight of the total weight of the emulsion, and the quantity of said amine salt being within the range of 0.1 to 0.5 part by weight per part of said polyacylated product and thinner.

8. An emulsion consisting essentially of water, di-(12-hydroxystearoyl) triethylenetetramine, a water immiscible thinner in which said di-(12-hydroxystearoyl) triethylenetetramine is at least partially soluble, and a salt of a water soluble acid and a primary alkyl mono-amine in which the alkyl group contains 8 to 18 carbon atoms, inclusive, the quantity of said water immiscible thinner not exceeding 5 parts by weight per part of said di-(12-hydroxystearoyl) triethylenetetramine and not exceeding 50% by weight of the total weight of the emulsion, the quantity of di-(12-hydroxystearoyl) triethylenetetramine not exceeding 50% by weight of the total emulsion, the quantity of the amine salt being within the range of 0.1 to 0.5 part by weight per part of said di-(12-hydroxystearoyl) triethylenetetramine and thinner, and the quantity of said primary alkyl mono-amine salt being effective to emulsify said di-(12-hydroxystearoyl) triethylenetetramine.

9. An emulsion consisting essentially of water, di-(12-hydroxystearoyl) di-ethylenetriamine, a water immiscible thinner in which said di-(12-hydroxystearoyl) di-ethylenetriamine is at least partially soluble, and a salt of a water soluble acid and a primary alkyl mono-amine in which the alkyl group contains 8 to 18 carbon atoms, inclusive, the quantity of said water immiscible thinner not exceeding 5 parts by weight per part of said di-(12-hydroxystearoyl) di-ethylenetriamine and not exceeding 50% by weight of the total weight of the emulsion, the quantity of di-(12-hydroxystearoyl) di-ethylenetriamine not exceeding 50% by weight of the total emulsion, the quantity of the amine salt being within the range of 0.1 to 0.5 part by weight per part of said di-(12-hydroxystearoyl) di-ethylenetriamine and thinner, and the quantity of said primary alkyl mono-amine salt being effective to emulsify said di-(12-hydroxystearoyl) di-ethylenetriamine.

10. An emulsion consisting essentially of water, diricinoleyl triethylenetetramine, a water-immiscible thinner in which said diricinoleyl triethylenetetramine is at least partially soluble, and a salt of a water soluble acid and a primary alkyl mono-amine in which the alkyl group contains 8 to 18 carbon atoms, inclusive, the quantity of said primary alkyl mono-amine salt being effective to emulsify said diricinoleyl triethylenetetramine, the quantity of said water immiscible thinner not exceeding 5 parts by weight per part of said diricinoleyl triethylenetetramine and not exceeding 50% by weight of the total weight of the emulsion, the quantity of said diricinoleyl triethylenetetramine not exceeding 50% by weight of the total weight of the emulsion, and the quantity of said amine salt being within the range of 0.1 to 0.5 part by weight per part of said diricinoleyl triethylenetetramine and thinner.

11. A method of inhibiting foaming in an aqueous liquid subject to foaming which comprises adding to said liquid an emulsion comprising water, a polyacylated polyalkylene polyamine from the group consisting of polyethylene polyamines and polypropylene polyamines, said polyacylated polyalkylene polyamine containing at least two acyl groups each having at least one hydroxy substituent and at least 12 carbon atoms, the total number of carbon atoms in the molecule being within the range of 30 to 60 carbon atoms, inclusive, a water-immiscible thinner in which said polyamine is at least partially soluble, and a quantity of a salt of an amine effective to emulsify said polyacylated polyalkylene polyamine, said salt of said amine being a salt of a water soluble acid with an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic mono-amines and heterocyclic amines, the quantity of said water immiscible thinner not exceeding 5 parts by weight per part of said polyacylated polyalkylene polyamine and not exceeding 50% by weight of the total weight of the emulsion, the quantity of said polyacylated polyalkylene polyamine not exceeding 50% by weight of the total emulsion, the quantity of the amine salt being within the range of 0.1 to 0.5 part by weight per part of said polyacylated polyalkylene polyamine and thinner, and the quantity of said emulsion being effective to inhibit said foaming.

12. A method of inhibiting foaming in an aqueous liquid subject to foaming which comprises adding to said liquid an emulsion comprising water, a polyacylated polyethylene polyamine in which there are at least two acyl groups containing hydroxy substituents and at least 12 carbon atoms, the total number of carbon atoms in the molecule being within the range of 30 to 60 carbon atoms, inclusive, dispersed in a water-immiscible thinner and emulsified in water with a salt of a water soluble acid and an amine selected from the group consisting of primary alkyl mono-amines in which the alkyl group contains at least 8 carbon atoms, secondary alkyl mono-amines in which the alkyl groups contain at least 8 carbon atoms, tertiary alkyl mono-amines in which the alkyl groups contain at least 5 carbon atoms, aromatic mono-amines and heterocyclic amines, the quantity of said amine salt being effective to emulsify said polyacylated polyamine, the quantity of said water immiscible thinner not exceeding 5 parts by weight per part of said polyacylated polyethylene polyamine and not exceeding 50% by weight of the total weight of the emulsion, the quantity of said polyacylated polyethylene polyamine not exceeding 50% by weight of the total emulsion, the quantity of the amine salt being within the range of 0.1 to 0.5 part by weight per part of said polyacylated polyethylene polyamine and thinner, and the quantity of said emulsion being effective to inhibit said foaming.

13. A method of inhibiting foaming in an aqueous liquid subject to foaming which comprises adding to said liquid an emulsion comprising water, a diacylated polyethylene polyamine in which each acyl group contains at least one hydroxy group and 12 to 18 carbon atoms, the total number of carbon atoms in the molecule being within the range of 30 to 60 carbon atoms, inclusive, a water-immiscible thinner in which said polyamine is at least partially soluble, and a quantity of a salt of a water soluble acid and an alkyl mono-amine effective to emulsify said diacylated polyethylene polyamine, the alkyl groups in said alkyl mono-amine containing 8 to 18 carbon atoms in the case of the primary and secondary amines, and 5 to 18 carbon atoms in the case of the tertiary amines, the quantity of said water immiscible thinner not exceeding 5 parts by weight per part of said diacylated polyethylene polyamine and not exceeding 50% by weight of the total weight of the emulsion, the quantity of said diacylated polyethylene polyamine not exceeding 50% by weight of the total emulsion, the quantity of the amine salt being within the range of 0.1 to 0.5 part by weight per part of said diacylated polyethylene polyamine and thinner, and the quantity of said emulsion being effective to inhibit said foaming.

14. A method of inhibiting foaming in an aqueous liquid subject to foaming which comprises adding to said liquid an emulsion comprising water, diricinoleyl triethylenetetramine, a water-immiscible thinner in which said diricinoleyl triethylenetetramine is at least partially soluble, and a salt of a water soluble acid and a primary alkyl mono-amine in which the alkyl group contains 8 to 18 carbon atoms, inclusive, the quantity of said primary alkyl mono-amine salt being effective to emulsify said diricinoleyl triethylenetetramine, the quantity of said water immiscible thinner not exceeding 5 parts by weight per part of said diricinoleyl triethylenetetramine and not exceeding 50% by weight of the total weight of the emulsion, the quantity of diricinoleyl triethylenetetramine not exceeding 50% by weight of the total emulsion, the quantity of the amine salt being within the range of 0.1 to 0.5 part by weight per part of said diricinoleyl triethylenetetramine and thinner, and the quantity of said emulsion being effective to inhibit said foaming.

15. A method of inhibiting foaming in an aqueous liquid subject to foaming and having a pH within the range of about 4.5 to about 7, which comprises adding to said liquid an emulsion having a pH within the range of about 6 to about 8 comprising water, a polyacylated polyethylene polyamine in which there are at least two acyl groups containing a hydroxy substituent and at least 12 carbon atoms, the total number of carbon atoms in the molecule of said polyamine being within the range of 30 to 60 carbon atoms, inclusive, a water-immiscible thinner in which said polyamine is at least partially soluble and a quantity of an acetate salt of an alkyl mono-amine containing 8 to 18 carbon atoms in the case of the primary and secondary mono-amines, and 5 to 18 carbon atoms in the case of the tertiary mono-amines, the quantity of said amine salt being effective to emulsify said polyacylated polyamine, the quantity of said water immiscible thinner not exceeding 5 parts by weight per part of said polyacylated polyethylene polyamine and not exceeding 50% by weight of the total weight of the emulsion, the quantity of said polyacylated polyethylene polyamine not exceeding 50% by weight of the total emulsion, the quantity of the amine salt being within the range of 0.1 to 0.5 part by weight per part of said polyacylated polyethylene polyamine and thinner, and the quantity of said emulsion being effective to inhibit said foaming.

16. A method of inhibiting foaming in an aqueous liquid having a pH of about 4.5 to about 7 which comprises adding to said liquid an emulsion of a polyacylated polypropylene polyamine in which there are at least two acyl groups containing a hydroxy substituent and 12 to 18 carbon atoms, the total number of carbon atoms in the molecule of said polyacylated polypropylene polyamine being within the range of 30 to 60 carbon atoms, inclusive, said polyacylated polypropylene polyamine being dispersed in a water-immiscible solvent and emulsified in water with at least one salt of a water soluble acid and a primary alkyl mono-amine containing 8 to 18 carbon atoms in the alkyl group, the quantity of said water immiscible thinner not exceeding 5 parts by weight per part of said polyacylated polypropylene polyamine and not exceeding 50% by weight of the total weight of the emulsion, the quantity of said polyacylated polypropylene polyamine not exceeding 50% by weight of the total emulsion, the quantity of the amine salt being within the range of 0.1 to 0.5 part by weight per part of said polyacylated polypropylene polyamine and thinner, and the quantity of said emulsion being effective to inhibit said foaming.

17. A method of inhibiting foaming in an aqueous liquid having a pH of about 4.5 to about 7 which comprises adding to said liquid an emulsion of a polyacylated polyethylene polyamine in which there are at least two acyl groups containing a hydroxy substituent and 12 to 18 carbon atoms, the total number of carbon atoms in the molecule of said polyacylated polyethylene polyamine being within the range of 30 to 60 carbon atoms, inclusive, said polyacylated polyethylene polyamine being dispersed in a water-immiscible solvent and emulsified in water with at least one salt of a water soluble acid and a primary alkyl mono-amine containing 8 to 18 carbon atoms in the alkyl group, the quantity of said water immiscible thinner not exceeding 5 parts by weight per part of said polyacylated polyethylene polyamine and not exceeding 50% by weight of the total weight of the emulsion, the quantity of said polyacylated polyethylene polyamine not exceeding 50% by weight of the total emulsion, the quantity of the amine salt being within the range of 0.1 to 0.5 part by weight per part of said polyacylated polyethylene polyamine and thinner, and the quantity of said emulsion being effective to inhibit said foaming.

18. A method of inhibiting foaming in an aqueous liquid having a pH within the range of about 4.5 to about 7 which comprises adding to said liquid an emulsion of diricinoleyl triethylenetetramine dispersed in a water-immiscible solvent and emulsified in water with at least one salt of a water soluble acid and a primary alkyl mono-amine containing 8 to 18 carbon atoms in the alkyl group, the quantity of said water immiscible thinner not exceeding 5 parts by weight per part of said diricinoleyl triethylenetetramine and not exceeding 50% by weight of the total weight of the emulsion, the quantity of diricinoleyl triethylenetetramine not exceeding 50% by weight of the total emulsion, the quantity of the amine salt being within the range of 0.1 to 0.5 part by weight per part of said diricinoleyl triethylenetetramine and thinner, and the quantity of said emulsion being effective to inhibit said foaming.

References Cited in the file of this patent

UNITED STATES PATENTS

| Number | Name | Date |
|---|---|---|
| 1,981,634 | Richardson et al. | Nov. 20, 1934 |
| 2,140,519 | Elston | Dec. 20, 1938 |
| 2,274,807 | Rawlins et al. | Mar. 3, 1942 |
| 2,317,959 | Johnson et al. | Apr. 27, 1943 |
| 2,356,408 | Kelley | Aug. 22, 1944 |
| 2,366,727 | Gunderson | Jan. 9, 1945 |
| 2,442,768 | Gunderson | June 8, 1948 |